(12) United States Patent
Suutari (10) Patent No.: US 12,447,422 B2
(45) Date of Patent: Oct. 21, 2025

(54) FILTER DIAPHRAGM FOR A RECESSED PLATE-TYPE FILTER, A DIAPHRAGM FILTER PLATE, A DIAPHRAGM FILTER PLATE ASSEMBLY AND A RECESSED PLATE-TYPE FILTER

(71) Applicant: Metso Outotec Finland Oy, Tampere (FI)

(72) Inventor: Teppo Suutari, Heituinlahti (FI)

(73) Assignee: METSO FINLAND OY, Espoo (FI)

( * ) Notice: Subject to any disclaimer, the term of this patent is extended or adjusted under 35 U.S.C. 154(b) by 428 days.

(21) Appl. No.: 17/797,018

(22) PCT Filed: Feb. 7, 2020

(86) PCT No.: PCT/FI2020/050076
§ 371 (c)(1),
(2) Date: Aug. 2, 2022

(87) PCT Pub. No.: WO2021/156536
PCT Pub. Date: Aug. 12, 2021

(65) Prior Publication Data
US 2023/0064222 A1  Mar. 2, 2023

(51) Int. Cl.
*B01D 25/21* (2006.01)
*B01D 25/164* (2006.01)
*B01D 25/28* (2006.01)

(52) U.S. Cl.
CPC ......... *B01D 25/285* (2013.01); *B01D 25/164* (2013.01); *B01D 25/215* (2013.01)

(58) Field of Classification Search
CPC ... B01D 25/164; B01D 25/215; B01D 25/285
See application file for complete search history.

(56) References Cited

U.S. PATENT DOCUMENTS 4,608,164 A    8/1986  Neu
2013/0327723 A1  12/2013  Juergen

FOREIGN PATENT DOCUMENTS

| DE | 19602977 C1 | 2/1997 |
| KR | 20040060300 A | 7/2004 |
| WO | 03095063 A1 | 11/2003 |

OTHER PUBLICATIONS

International Search Report and Written Opinion for International Application No. PCT/FI2020/050076, mailed May 28, 2020.
Supplementary European Search Report for European Application No. 20918116, dated Jul. 27, 2023.

*Primary Examiner* — Bradley R Spies
(74) *Attorney, Agent, or Firm* — Andrus Intellectual Property Law, LLP (57) ABSTRACT

A filter diaphragm for a filter plate assembly of a recessed plate-type filter, such as a filter press or a tower press. The diaphragm includes a sheet-like body having a flexible structure, and, at least on a side of the body, a plurality of distinct attachment studs to be inserted into corresponding distinct attachment holes of a respective filter plate for attaching the diaphragm to the filter plate. The attachment studs are arranged along a sealing region extending along a periphery of the filter diaphragm and extend in a direction perpendicular to the diaphragm body. The attachment studs are equipped with an opening extending through the filter diaphragm, between the opposing sides thereof. A diaphragm filter plate and -assembly, and filter are also concerned.

16 Claims, 6 Drawing Sheets

FILTER DIAPHRAGM FOR A RECESSED PLATE-TYPE FILTER, A DIAPHRAGM FILTER PLATE, A DIAPHRAGM FILTER PLATE ASSEMBLY AND A RECESSED PLATE-TYPE FILTER

CROSS-REFERENCE TO RELATED APPLICATIONS

This application is the U.S. national stage application of International Application PCT/FI2020/050076, filed Feb. 7, 2020, which international application was published on Aug. 12, 2021, as International Publication WO 2021/156536 A1 in the English language.

FIELD OF THE DISCLOSURE

The present disclosure relates to recessed plate-type filters, such as filter presses and tower presses, and more particularly to a filter diaphragm, a diaphragm filter plate and a diaphragm filter plate assembly for such a filter. The present disclosure further concerns such a recessed plate-type filter itself.

BACKGROUND OF THE DISCLOSURE

In a recessed plate-type filter, a diaphragm is used to squeeze remaining liquid content from a filter cake formed in a filter chamber. The diaphragm is typically attached to an associated filter plate either by clamping it between the filter plate and a separate clamping component, or by providing the diaphragm and filter plate with a bead and groove, respectively.

In cases where the diaphragm has been attached to the filter plate by clamping, the clamping component is typically secured with separate fasteners, such as bolts and clamps, which are susceptible to corrosion in typical filtration environments. Moreover, such attachment typically requires access to both sides of the filter plate, requiring the filter plate to be manipulated during installation.

In cases where the diaphragm has been attached to the filter plate by inserting the bead of the diaphragm into a groove of the filter plate, the groove on the filter plate forms a discontinuity on the plate structure at an disadvantageous location, where a local maximum of internal stresses is exhibited. This has led to decreased longevity of the filter plate. Moreover, the bead and the groove form a pocket into which impurities entrained along with the compression medium used to pressurize the diaphragm may build-up or accumulate. This, in turn causes premature wear of the diaphragm.

BRIEF DESCRIPTION OF THE DISCLOSURE

An object of the present disclosure is to provide a recessed plate-type filter and a filter diaphragm, a diaphragm filter plate and a diaphragm filter plate assembly for such a filter, which provide for improved longevity and facilitate installation.

The object of the disclosure is achieved by the filter diaphragm, diaphragm filter plate, diaphragm filter plate assembly and a filter which characterized by what is stated in the independent claims. The preferred embodiments of the disclosure are disclosed in the dependent claims.

The disclosure is based on the idea of providing filter diaphragm with studs, and the diaphragm filter late with corresponding holes, such that the diaphragm can be attached to the plate by inserting the studs into the holes.

This provides multiple synergistic advantages. Firstly, the diaphragm can be attached ed to the plate from one side, thus removing the need to turn the heavy filter plate around during the attachment process.

Moreover, the stud and opening can be formed on the diaphragm and plate, respectively, thus eliminating the need to use separate components such as metal nuts, bolts or bushing which are susceptible to corrosion.

Additionally, using distinct, separate studs and holes, as opposed to a typical continuous bead inserted into a corresponding groove, provides a structure in which a pocket is not formed at the interface between the diaphragm and the plate (i.e. at the base of the bead).

The lack of such a pocket prevents build-up or accumulation of impurities entrained along with the compression medium used to pressurize the diaphragm so as to squeeze the filter cake. Build-up or accumulation of such impurities is undesirable because it rubs against the diaphragm causing premature wear.

Finally, the solutions according to the present invention provide a structure in which a local maximum of internal stresses caused by an annular groove on the diaphragm filter plate is not exhibited.

BRIEF DESCRIPTION OF THE DRAWINGS

In the following the disclosure will be described in greater detail by means of preferred embodiments with reference to the accompanying drawings, in which FIG. 1 schematically illustrates a diaphragm filter plate assembly according to an embodiment of the present disclosure, as seen from a diaphragm side thereof.

DETAILED DESCRIPTION OF THE DISCLOSURE

According to a first aspect of the present disclosure, a filter diaphragm 1 for a filter plate assembly 10 of a recessed plate-type filter is provided. Well known examples of such recessed plate-type filter include filter presses and tower presses.

The filter diaphragm 1 comprises, comprising a sheet-like body 2 having a flexible structure. That is, the structure of the diaphragm body 2 is able to yield without permanent deformation so as the press a filter cake formed in a filter chamber of an associated filter.

Moreover, the filter diaphragm 1 comprises, at least on a side of the body 2, a plurality of distinct attachment studs 3 for being inserted into corresponding distinct attachment holes 9 of a respective filter plate 5 for attaching the diaphragm 1 to the filter plate 5. The attachment studs 3 are arranged along a sealing region 4 extending along a periphery of the filter diaphragm 1. Most suitably, the attachment studs 3 extend in a direction perpendicular to the diaphragm body 2.

Particularly, the attachment studs 3 are equipped with an opening 3a extending through the filter diaphragm 1, between the opposing sides thereof.

This arrangement provides a structure that prevents the formation or build-up of impurities at the interface of the filter diaphragm 2 and the diaphragm filter plate 5 without the need for separate attachment components that as susceptible to corrosion. At the same time, the opening (i.e. hollowness) of the stud enables pressure to equalize between the bottom of the associated hole 9 and the surrounding environment, thus preventing the stud from being popped out of the hole 9, further ensuring secure attachment between the filter diaphragm 2 and the filter plate 5.

Preferably, but not necessarily, the filter diaphragm 1 is suitable for a plate assembly 10 of a recessed plate-type filter, in which a collector duct for pressurizing a side of the diaphragm, so as to squeeze a filter cake, is sectionally formed by a plurality of filter plates 5 equipped with corresponding sectional openings 6a. The solution according to the present disclosure ais particularly advantageous in filters of such types, because contamination of impurities is a particularly prominent problem. This is because, the sectionally formed collector duct is opened each together with opening the filter chambers for discharging the filter cake. At this time impurities can readily contaminate the open duct.

Preferably, but not necessarily, at least the body 2 of the filter diaphragm is of an elastic material, such as a synthetic elastomer or rubber. This facilitates in achieving a flexible structure of the diaphragm 1 body 2.

In an embodiment according to the first aspect of the present disclosure a portion 3b of increased diameter is formed on distal portions of the attachment studs 3. This further improves secure attachment of the diaphragm 1 to the diaphragm filter plate 5. Alternatively, the studs 3 may be formed between a proximal portion and the distal portion of the stud 3.

Preferably, but not necessarily, the portion 3b of increased diameter is formed as an annular bulge. Alternatively, the portion 3b of increased diameter could be provided as on or more distinct projections, such as knobs. If a plurality of such distinct projections is provided, the projections are suitably spaced apart from each other along the periphery of the stud 3.

Preferably, but not necessarily, the plurality of attachment studs 3 are formed integral with the diaphragm body 2. Alternatively, the studs 3 may be provided as separate parts, which are then pushed through the diaphragm body 3 so as to attach the separate studs 3 to the diaphragm body 2.

In an embodiment according to the first aspect of the present disclosure, the sealing region 4 is formed as a bead at least partly surrounding the remaining portion of the diaphragm body 2.

Preferably, but not necessarily, the sealing region 4 is integral with the diaphragm body 2.

In an embodiment according to the first aspect of the present disclosure, the surface of the sealing region 4 is substantially flat in portions thereof where studs 3 or associated openings 3a are not present. That is, the general shape of the sealing region 4 is flat, while local deviations, having negligible contribution to the attachment between the filter diaphragm 1 and the associate diaphragm filter plate 5, are permitted. For example, in the context of the present disclosure, the sealing region 4 may be considered substantially flat, while being equipped with grooves or ribs for improving the sealing effect (i.e. increasing the surface contact pressure) of the sealing region 4. Should such grooves or ribs be provided, they may preferably be arranged as annularly extending along the sealing region 4.

In an embodiment according to the first aspect of the present disclosure, the sealing region 4 has an increased thickness with respect to non-elevated portions of the remaining diaphragm body 2. It should be noted, however, that the diaphragm body 2 may be provided with elevated portions, such as protuberances, knobs or the like, which may have a local material thickness higher than that of the sealing region 4.

It should be noted that the first aspect of the present disclosure encompasses any combination of one or more embodiments, or variants thereof, as discussed above.

According to a second aspect of the present disclosure, a diaphragm filter plate 5 for a diaphragm filter plate assembly 10 of a recessed plate-type filter, such as a filter press or a tower press, is provided.

The diaphragm filter plate 5 comprises a frame region 6 surrounding and having an increased thickness with respect to the remaining portion of the filter plate 5.

The diaphragm filter plate 5 further comprises, at least on a first surface of the diaphragm filter plate 5, a web region 7 confined by, and recessed with respect to the frame region 7.

The diaphragm filter plate 5 further comprises, a sealing plane 8 between the frame region 6 and the web region 7. The sealing plane 8 surrounds the web region 7 and is recessed with respect to the frame region 6.

Particularly, the sealing plane 8 of the diaphragm filter plate 5 further comprises a plurality of distinct attachment holes 9 for receiving attachment studs 3 of a filter diaphragm 1, such as the one discussed in connection with the first aspect of the present disclosure.

Preferably, but not necessarily, the holes 9 are blind holes, which provides for a higher structural strength of the diaphragm filter plate 5 at the hole 9, as compare to a through hole.

In an embodiment according to the second aspect of the present disclosure, the frame region 6 is equipped with an opening 6a extending therethrough for forming a section of a collector duct suitable for pressurizing the filter diaphragm 1, so as to squeeze a filter cake.

Suitably, the opening 6a is in fluid communication with the web region 7 via a conduit extending therebetween.

Moreover, opening 6a may be formed as an integral part of the frame region 6, or alternatively, as a separate piece attached to the remaining frame portion 6.

In an embodiment according to the second aspect of the present disclosure, the sealing plane 8 has a substantially flat surface for mating against a sealing region 4 of the filter diaphragm 1. That is, the general shape of the sealing plane 8 is flat, while local deviations, having negligible contribution to the attachment between the filter diaphragm 1 and the associate diaphragm filter plate 5, are permitted. For example, in the context of the present disclosure, the sealing plane 8 may be considered substantially flat, while being equipped with grooves or ribs for improving the sealing effect (i.e. increasing the surface contact pressure) of the sealing plane 8. Should such grooves or ribs be provided, they may preferably be arranged as annularly extending along the sealing plane 8.

In an embodiment according to the second aspect of the present disclosure, the attachment holes 9 comprises an undercut 9a. This further improves secure attachment of the diaphragm 1 to the diaphragm filter plate 5. Preferably, such an undercut may be formed at the bottom of the associated hole 9. Alternatively, the undercut be formed between a proximal portion and the distal portion of the hole 9.

Preferably, but not necessarily, the undercut is formed as an annular groove. Alternatively, the undercut could be provided as on or more distinct notches such as knobs. If a plurality of such distinct notches is provided, the notches are suitably spaced apart from each other along the inner circumference of the hole 9.

It should be noted that the second aspect of the present disclosure encompasses any combination of one or more embodiments, or variants thereof, as discussed above.

According to a third aspect of the present disclosure, a diaphragm filter plate assembly 10 for a recessed plate-type filter, such as a filter press or a tower press, is provided.

The diaphragm filter plate assembly 10 comprises the filter diaphragm 1 according to the first aspect of the present disclosure, as discussed above, and the diaphragm filter plate 5 according to the second aspect of the present disclosure, as discussed above.

The filter diaphragm 1 is received by the diaphragm filter plate 5 such that the sealing region 4 is mated against the sealing plane 8 and the remaining portion of the diaphragm body 2 is received within the web region 7 of the filter plate 5 confined by the sealing plane 8. The attachment studs 3 of the filter diaphragm 1 are received in the attachment holes 9.

In an embodiment according to the third aspect of the present disclosure, a plurality of pins 11 are inserted into openings 3a of the attachment studs 3.

Preferably, but not necessarily, such pins 11 are of a more rigid material than the studs. This arrangement further improves secure attachment between the filter diaphragm and the diaphragm filter plate 5.

Preferably, but not necessarily, the pins 11 are hollow, which allows for equalizing pressure between the bottom of the hole 9, and the surrounding environment.

In an embodiment according to the third aspect of the present disclosure, the sealing region 4 of the filter diaphragm 1 is elevated from the frame region 6 of the diaphragm filter plate in an uncompressed state. This ensures that the sealing region 4 is compressed when adjacent filter plates are pressed together to close the filter chamber.

In an embodiment according to the third aspect of the present disclosure, the web region 7 of the diaphragm filter plate 5 comprises at least an elevated portion 7a having continuous closed groove 7b, and wherein filter diaphragm 1 comprises at least an continuous closed beaded edge 2a, wherein the beaded edge 2a is received within the groove 7c. Such an arrangement between the filter diaphragm 1 and the diaphragm filter plate 5 at the web region 7 of the latter further ensures secure attachment. Moreover, because the groove 7b and the beaded edge 2a do not confine the filter diaphragm 1, a pocket is not formed, and the build-up of impurities is not considered to be negligible.

It should be noted that the third aspect of the present disclosure encompasses any combination of one or more embodiments, or variants thereof, as discussed above.

According to a fourth aspect of the present disclosure, a recessed plate-type filter, such as a filter press or tower press, is provided.

The filter comprises a plurality of diaphragm filter plate assemblies 10 according to the third aspect of the disclosure, as discussed above. Moreover, the diaphragm filter plate assemblies 10 are configured movable towards each other into a closed position in which a filter chamber is formed between adjacent diaphragm filter plate assemblies, and away from each to an open position in which adjacent diaphragm filter plate assemblies are spaced apart from each other.

The filter further comprises a filter medium arranged between adjacent diaphragm filter plate assemblies.

The filter further comprises a translation arrangement for moving the diaphragm filter plate assemblies 10 towards each other so as to form a filter chamber between adjacent filter plates, and away from each other so as to open the filter chamber.

The filter further comprises a feed arrangement for feeding slurry into the filter chamber.

The filter further comprises a recovering arrangement for recovering filtrate from the filter chamber.

The filter further comprises a discharge arrangement for discharging a filter cake formed within the filter chamber.

In an embodiment according to the fourth aspect of the present disclosure, the filter further comprises a plurality of chamber filter plate assemblies. In such a case, the diaphragm filter plate assemblies 10 and the chamber filter plate assemblies are arranged in an alternating sequence so as to form the filter chamber between an adjacent diaphragm filter plate assembly 10 and a chamber filter plate assembly.

In an embodiment according to the fourth aspect of the present disclosure, the filter comprises a compression arrangement for providing pressurized compression media on a side of the filter diaphragm opposite to the filter chamber.

It should be noted that the fourth aspect of the present disclosure encompasses any combination of one or more embodiments, or variants thereof, as discussed above.

Figure 1:
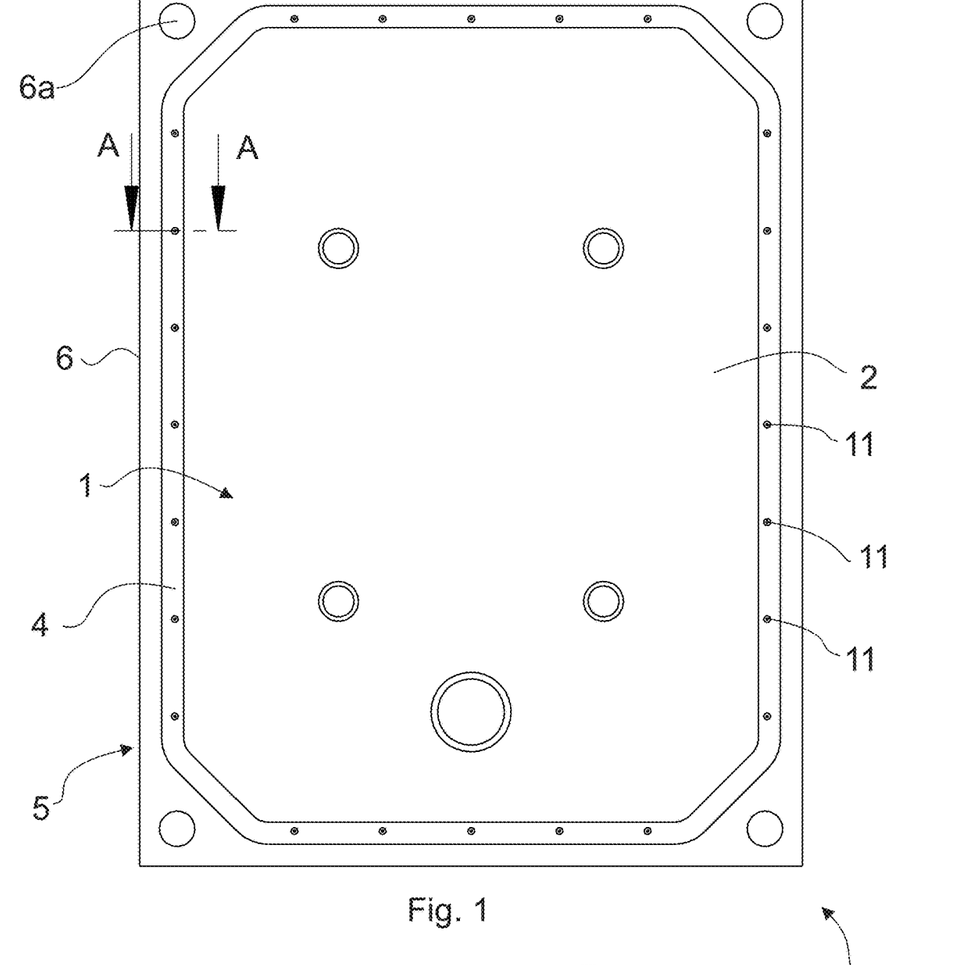

FIG. 1 schematically illustrates a diaphragm filter plate assembly 10 according to an embodiment of the present disclosure, as seen from a diaphragm side thereof. Particularly, the filter diaphragm 1 has been received by the diaphragm filter plate 5 such that the frame region 6 of the diaphragm filter plate 5 boundaries the filter diaphragm 1.

A plurality of studs 3 are provided on the sealing region 4 of the diaphragm 1, spaced apart from each other along the sealing region 4. Pins 11 are inserted into the studs 3.

Figure 2:
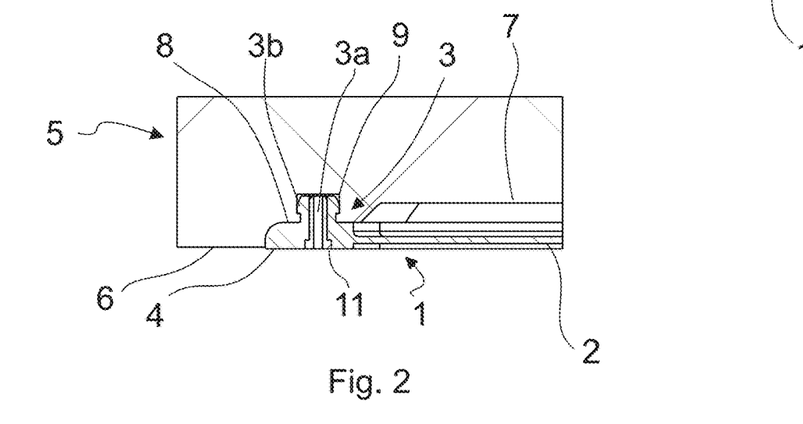
FIG. 2 schematically illustrates a cross-sectional cut vied along line A-A of FIG. 1.

FIG. 2 schematically illustrates a cross-sectional cut vied along line A-A of FIG. 1. This more clearly illustrates the mutual engagement between the diaphragm 1 and the diaphragm filter plate 5. Particularly, the sealing region 4 lies against the sealing surface 8 of the diaphragm filter plate 5, while the portion filter diaphragm body 2 delimited by the sealing region 4 is received by the web region 7 of the diaphragm filter plate 5. The studs 3 are inserted into corresponding holes 9 and pins 11 are inserted to the studs 3. As the pins 11 and studs 3 are hollow, pressure communication between the bottom of the hole 9 and the surrounding environment is allowed. A portion of increased diameter 3b is formed on the distal portion of the studs 3, corresponding to the undercut formed to the hole 9

Figure 3:
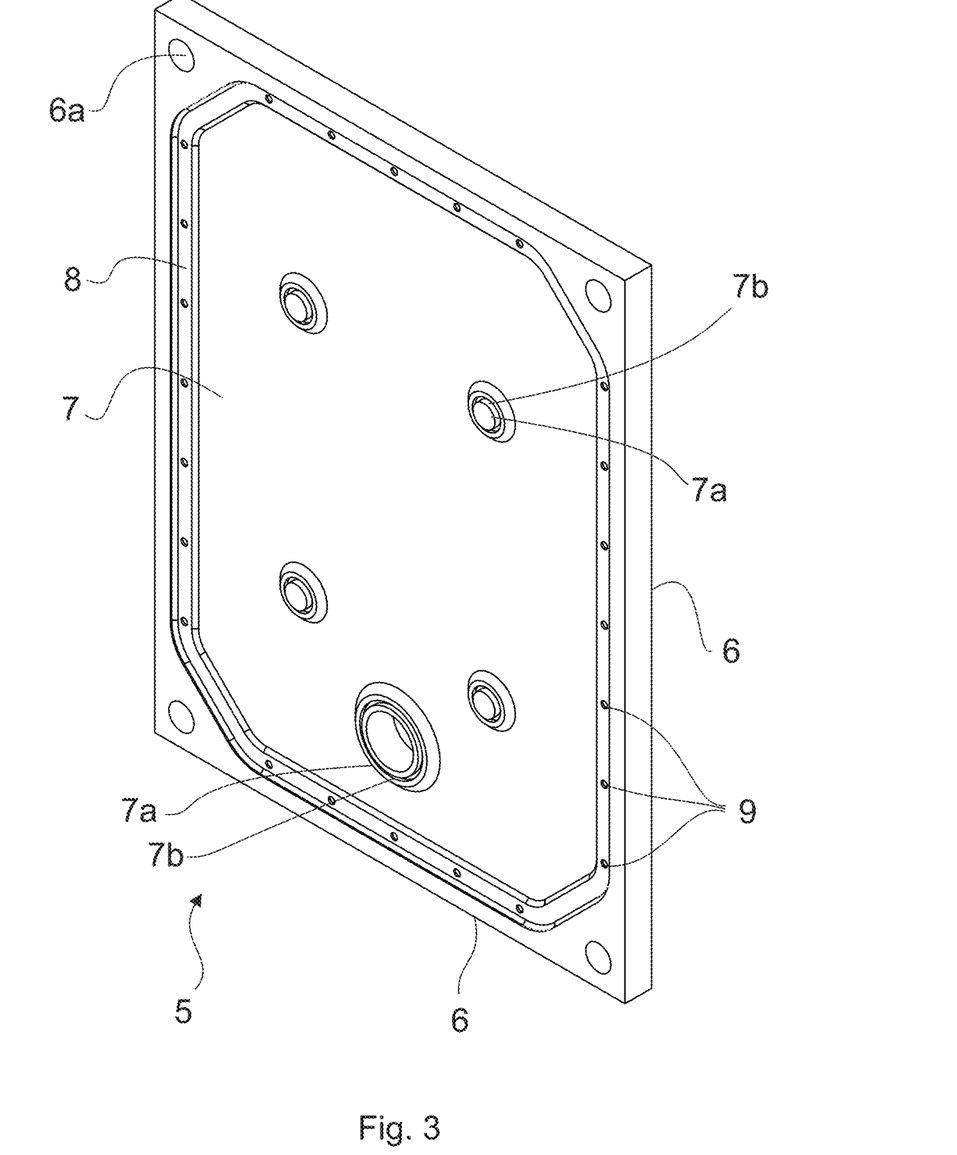
FIG. 3 schematically illustrates a diaphragm side of a diaphragm filter plate according to an embodiment of the present disclosure, as seen as a perspective view.

FIG. 3 schematically illustrates a diaphragm side of a diaphragm filter plate 5 of FIG. 1, without the diaphragm 1. Elevated portions 7a having a continuous closed groove 7b, are provided on the web portion 7, for providing additional attachment between the filter diaphragm 1 and the diaphragm filter plate 5.

Figure 4:
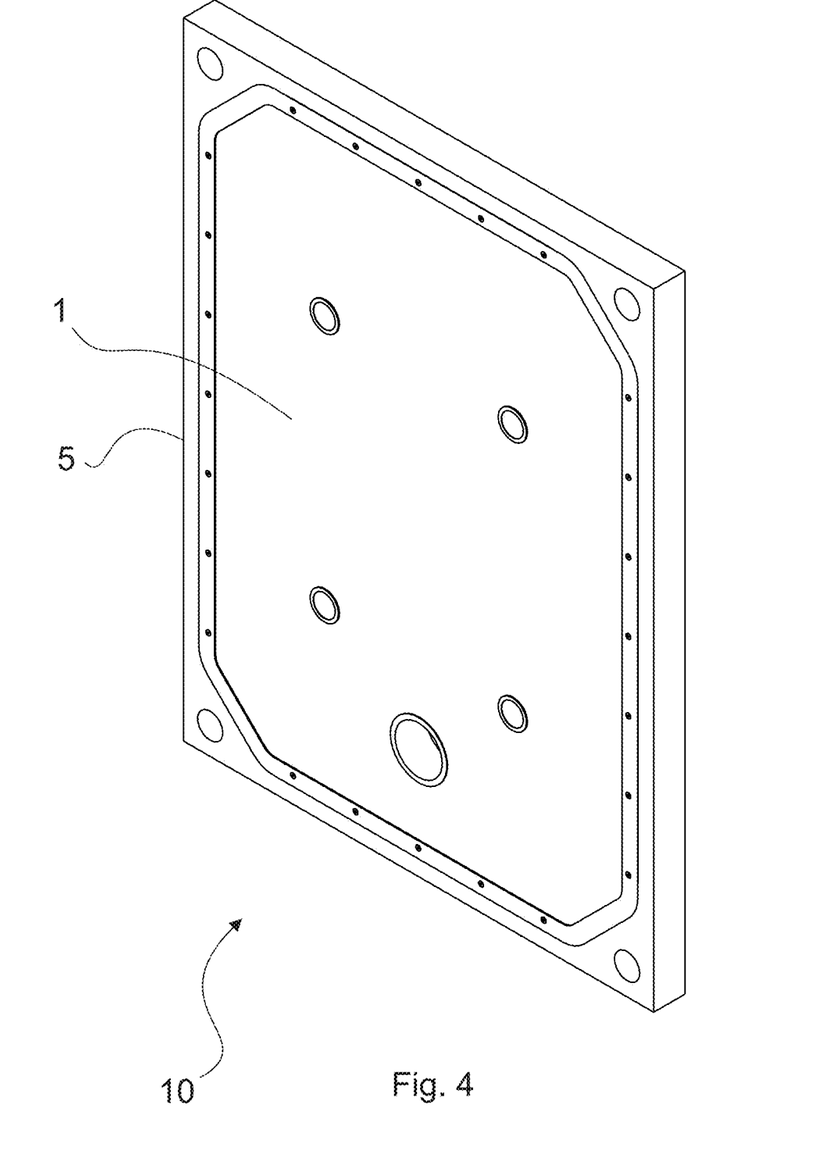
FIG. 4 schematically illustrates a diaphragm side of a diaphragm filter plate assembly according to an embodiment of the present disclosure, as seen as a perspective view.
Figure 5:
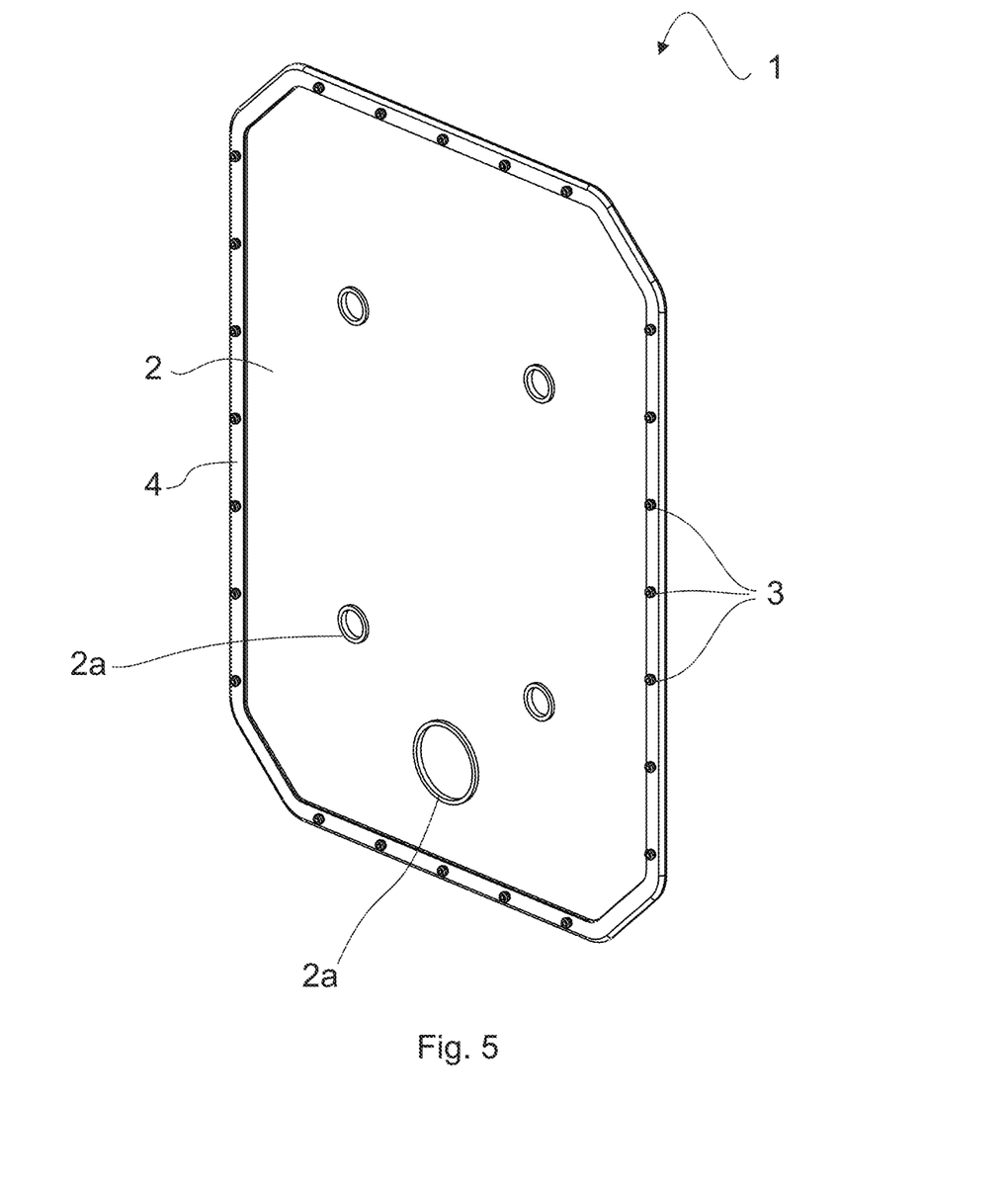
FIG. 5 schematically illustrates a plate side of a filter diaphragm according to an embodiment of the present disclosure, as seen as a perspective view.

FIG. 4 schematically illustrates the diaphragm side of a diaphragm filter plate assembly of FIG. 1, as seen as a perspective view;

FIG. 5 schematically illustrates a plate side, i.e. the facing the diaphragm filter plate to which it is attached when in use, of a filter diaphragm 1 according to an embodiment of the present disclosure, as seen as a perspective view. Particularly, the sealing region 4 of the filter diaphragm 1 surrounds the remaining portion of the filter diaphragm body 2. A plurality of studs 3 protruding from the sealing region 4 are spaced apart from each other along said sealing region 4. Continuous closed beaded edges 2a are provided on the portion of the body 2 surrounded by the sealing region, for additional attachment between the filter diaphragm. Particularly, the beaded edge 2a is receivable within the groove 7c discussed above in connection with FIG. 3.

Figure 6:
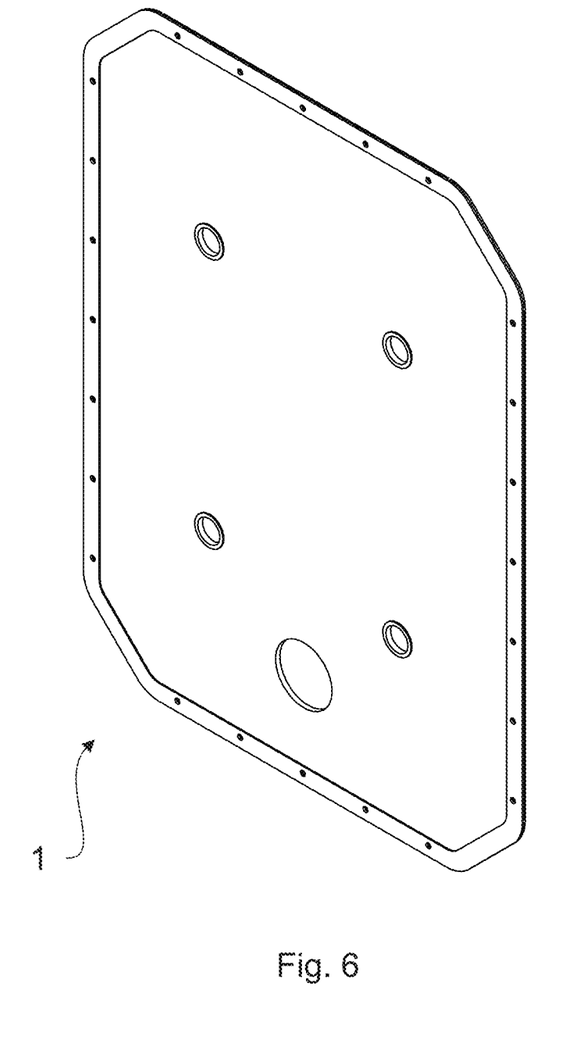
FIG. 6 schematically illustrates a chamber side of a filter diaphragm according to an embodiment of the present disclosure, as seen as a perspective view.
Figure 7:
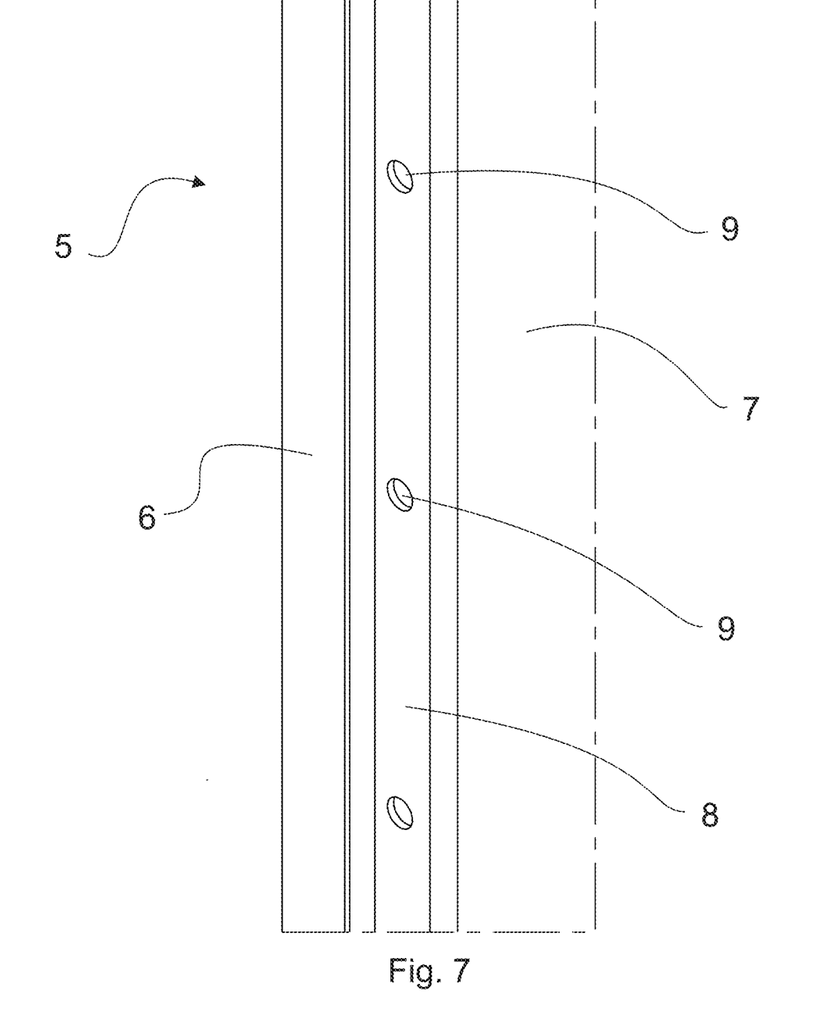
FIG. 7 schematically illustrates a detailed view of a frame region, sealing plane and a web region of a diaphragm filter plate according to an embodiment of the present disclosure.

FIG. 6 schematically illustrates a chamber side, i.e. the opposing side, of the filter diaphragm of FIG. 5, as seen as a perspective view;

FIG. 7 schematically illustrates a detailed view of a frame region 6, sealing plane 8 and a web region 7 of a diaphragm filter plate 5 of FIG. 3.

Figure 8:
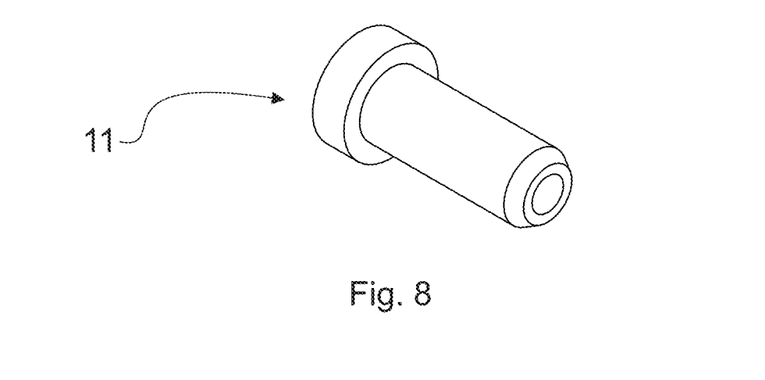
FIG. 8 schematically illustrates a pin of a diaphragm filter plate assembly according to an embodiment of the present disclosure.

FIG. 8 schematically illustrates a more detailed view of the pin 11. As can be seen, the hollow opening of the pin 11 extends to the bottom thereof.

Although the aspects and embodiments have been described above with reference a single sided diaphragm filter plate assembly 10, i.e. an arrangement where the diaphragm 1 is only on one side of the diaphragm filter plate 5, it should be noted that the present disclosure encompasses arrangements in which a filter diaphragm 1 is provided on both sides of a diaphragm filter plate.

The invention claimed is:

1. A filter diaphragm for a filter plate assembly of a recessed plate-type filter, such as a filter press or a tower press, comprising:
    a sheet-like body having a flexible structure; and
    at least on a side of the body, a plurality of distinct attachment studs to be inserted into corresponding distinct attachment holes of a respective filter plate for attaching the diaphragm to the filter plate,
    wherein the attachment studs are arranged along a sealing region extending along a periphery of the filter diaphragm, the sealing region being formed as a bead at least partly surrounding the remaining portion of the diaphragm body,
    wherein the attachment studs extend in a direction perpendicular to the diaphragm body, and
    wherein the attachment studs are equipped with an opening extending through the filter diaphragm, between the opposing sides thereof.

2. The filter diaphragm according to claim 1, wherein the filter diaphragm is suitable for a plate assembly of a recessed plate-type filter, in which a collector duct for pressurizing a side of the diaphragm, so as to squeeze a filter cake, is sectionally formed by a plurality of filter plates equipped with corresponding sectional openings.

3. The filter diaphragm according to claim 1, wherein at least the body thereof is of an elastic material.

4. The filter diaphragm according claim 1, wherein a portion of increased diameter is formed on distal portions of the attachment studs.

5. The filter diaphragm according to claim 1, wherein the plurality of attachment studs are formed integral with the diaphragm body.

6. The filter diaphragm according to claim 1, wherein the sealing region is integral with the diaphragm body.

7. The filter diaphragm according to claim 1, wherein the surface of the sealing region is substantially flat in portions thereof where studs or associated openings are not present.

8. The filter diaphragm according to claim 1, wherein the sealing region has an increased thickness with respect to non-elevated portions of the remaining diaphragm body.

9. A diaphragm filter plate assembly for a recessed plate-type filter, such as a filter press or a tower press, comprising:
    the filter diaphragm according to claim 1;
    a diaphragm filter plate, comprising:
        a frame region surrounding and having an increased thickness with respect to the remaining portion of the diaphragm filter plate;
        at least on a first surface of the diaphragm filter plate, a web region confined by, and recessed with respect to the frame region; and
        a sealing plane between the frame region and the web region, the sealing plane surrounding the web region, and being recessed with respect to the frame region,
        wherein the sealing plane of the diaphragm filter plate further includes a plurality of distinct attachment holes for receiving attachment studs of a filter diaphragm,
    wherein the filter diaphragm is received by the diaphragm filter plate such that the sealing region is mated against the sealing plane and the remaining portion of the diaphragm body is received within the web region of the filter plate confined by the sealing plane, and wherein the attachment studs of the filter diaphragm are received in the attachment holes.

10. The diaphragm filter plate assembly according to claim 9, further comprising a plurality of pins inserted into openings of the attachment studs.

11. The diaphragm filter plate assembly according to claim 10, wherein the pins are hollow.

12. The diaphragm filter plate assembly according to claim 9, wherein, in an uncompressed state, the sealing region of the filter diaphragm is elevated from the frame region of the diaphragm filter plate.

13. The diaphragm filter plate assembly according to claim 9, wherein the web region of the diaphragm filter plate comprises at least an elevated portion having continuous closed groove, and wherein filter diaphragm comprises at least an continuous closed beaded edge, wherein the beaded edge is received within the groove.

14. A recessed plate-type filter, such as a filter press or tower press, wherein the filter comprises:
    a plurality of diaphragm filter plate assemblies according to claim 9, wherein the diaphragm filter plate assemblies are configured movable towards each other into a closed position in which a filter chamber is formed between adjacent diaphragm filter plate assemblies, and away from each to an open position in which adjacent diaphragm filter plate assemblies are spaced apart from each other;
    a filter medium arranged between adjacent diaphragm filter plate assemblies;
    a translation arrangement for moving the diaphragm filter plate assemblies towards each other so as to form a filter chamber between adjacent filter plates, and away from each other so as to open the filter chamber;

a feed arrangement for feeding slurry into the filter chamber;

a recovering arrangement for recovering filtrate from the filter chamber; and a discharge arrangement for discharging a filter cake formed within the filter chamber.

15. The recessed plate-type filter according to claim 14, further comprising a plurality of chamber filter plate assemblies, wherein the diaphragm filter plate assemblies and the chamber filter plate assemblies are arranged in an alternating sequence so as to form the filter chamber between an adjacent diaphragm filter plate assembly and a chamber filter plate assembly.

16. The recessed plate-type filter according to claim 14 further comprising a compression arrangement for providing pressurized compression media on a side of the filter diaphragm opposite to the filter chamber.

\* \* \* \* \*